(12) United States Patent
Adler et al.

(10) Patent No.: US 11,787,376 B2
(45) Date of Patent: Oct. 17, 2023

(54) BRAKE SYSTEM FOR A VEHICLE

(71) Applicant: KNORR-BREMSE Systeme fuer Nutzfahrzeuge GmbH, Munich (DE)

(72) Inventors: Tamas Adler, Erd (HU); Tamas Rapp, Budapest (HU); Huba Nemeth, Budapest (HU); Kornel Straub, Pomáz (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 365 days.

(21) Appl. No.: 17/272,682

(22) PCT Filed: Aug. 29, 2019

(86) PCT No.: PCT/EP2019/073133
§ 371 (c)(1),
(2) Date: Mar. 2, 2021

(87) PCT Pub. No.: WO2020/057935
PCT Pub. Date: Mar. 26, 2020

(65) Prior Publication Data
US 2021/0339725 A1 Nov. 4, 2021

(30) Foreign Application Priority Data
Sep. 18, 2018 (EP) .................... 18195165

(51) Int. Cl.
*B60T 13/58* (2006.01)
*B60T 13/66* (2006.01)
*B60T 13/68* (2006.01)

(52) U.S. Cl.
CPC ............ *B60T 13/58* (2013.01); *B60T 13/662* (2013.01); *B60T 13/683* (2013.01);
(Continued)

(58) Field of Classification Search
CPC ...... B60T 13/58; B60T 13/662; B60T 13/683; B60T 2270/413; B60T 2270/402; B60T 2270/404; B60T 2270/82
See application file for complete search history.

(56) References Cited

U.S. PATENT DOCUMENTS 11,370,404 B2 * 6/2022 Michaelsen ........... B60T 13/683
2007/0170774 A1 * 7/2007 Gerum .................... B60T 13/66
188/140 R
(Continued)

FOREIGN PATENT DOCUMENTS

CN 101065540 A 10/2007
CN 101970270 A 2/2011
(Continued)

OTHER PUBLICATIONS

WO document No. 2020/057964 published Mar. 26, 2020 to Adler et al.*
(Continued)

*Primary Examiner* — Pamela Rodriguez
(74) *Attorney, Agent, or Firm* — NORTON ROSE FULBRIGHT US LLP; Gerard Messina

(57) ABSTRACT

A brake system, for a vehicle, includes a first electric-power-supply-unit (EPSU), and an electronic-brake-control-unit (EBCU) connected to the first EPSU. Furthermore, the brake system includes a first axle-pressure-modulator (APM) for service-brake-chambers associated with a first vehicle-axle.
(Continued)

The first APM is connected to the EBCU. The brake system includes a second APM for spring-brake-cylinders associated with a second vehicle-axle. The second APM is connected to the EBCU. The brake system further includes a second EPSU, and an electronic-parking-brake-controller (EPBC). The EPBC is connected to the second EPSU. The EPBC is fluidically connected to the spring-brake-cylinders. The brake system includes a pressure modulator unit (PMU) fluidically connected to the first APM. The PMU is connected to the EPBC, which issues a control-signal for controlling the PMU. The PMU commands pneumatic-control-pressure for the first APM depending on the control-signal from the EPBC.

10 Claims, 4 Drawing Sheets

(52) U.S. Cl.
CPC ... *B60T 2270/402* (2013.01); *B60T 2270/404* (2013.01); *B60T 2270/413* (2013.01); *B60T 2270/82* (2013.01)

(56) References Cited

U.S. PATENT DOCUMENTS

| | | | |
|---|---|---|---|
| 2008/0021623 | A1* | 1/2008 | Frey .................. B60T 8/321 701/70 |
| 2021/0323522 | A1* | 10/2021 | Adler ................ B60T 13/581 |

FOREIGN PATENT DOCUMENTS

| | | |
|---|---|---|
| CN | 108473124 A | 8/2018 |
| CN | 108883755 A | 11/2018 |
| DE | 102008009043 B3 | 5/2009 |
| DE | 102016005318 A1 | 11/2017 |
| EP | 1794368 A1 | 6/2007 |

OTHER PUBLICATIONS

International Search Report for PCT/EP2019/073133 dated Dec. 2, 2019.

* cited by examiner

BRAKE SYSTEM FOR A VEHICLE

FIELD OF THE INVENTION

The present invention relates to a brake system for a vehicle, to a vehicle with said brake system, and to a method of controlling a brake system for a vehicle.

BACKGROUND INFORMATION

Autonomous or near-autonomous operation of transport vehicles is a relatively new field of technology. More sophisticated functions require special hardware infrastructure. For example, present commercial vehicle systems require the presence and attention of a driver. However, in the future the driver will be less involved in the driving control task of the vehicle, and automated systems are supposed to take over more significant driving functions, which requires increased reliability levels and consequently different types of system redundancies.

Commercial vehicles conventionally use electro-pneumatic or by-wire brake systems, wherein the electronic part of the control is realized as a single-circuit control. In case of malfunction of the control electronics, the driver is able to control the pneumatic part of the brake system by their foot because a two-circuit pneumatic backup system still is available. In case of highly automated vehicles where the driver is not in the control loop anymore, or even not available or present in the vehicle, the above brake system would be unsatisfactory, since there is no arrangement/ structure which would substitute the brake control by the driver in case of malfunction of the single electronic control circuit. Therefore some redundancy is to be added to the control of a brake system.

Patent document DE 10 2008 009 043 B3 discusses a redundant brake system for a commercial vehicle. The system utilizes a parking brake integrated into an air supply unit as a redundant brake actuator. For axles not equipped with spring parking brake chambers, a control output of a trailer control module is used as pneumatic control input of axle modulators.

SUMMARY OF THE INVENTION

Against this background, it is an object of the present invention to provide an improved brake system for a vehicle, an improved vehicle with said brake system, and an improved method of controlling a brake system for a vehicle.

This object may be achieved by a brake system for a vehicle, by a vehicle with said brake system, and by a method of controlling a brake system for a vehicle according to the main claims.

According to embodiments, for example, there may be provided a redundant brake system or brake system with redundancy by way of the electronic parking brake controller redundantly performing service brake functions. In other words, for example, a brake system of a vehicle, particularly a commercial vehicle, with an electro-pneumatic service brake subsystem and an electro-pneumatic parking brake subsystem may be configured so that vehicle axles not equipped with spring brake chambers, e.g. front axles, are electrically controlled by the electronic parking brake controller via a pressure modulator unit.

Advantageously, according to embodiments, additional redundancy can be provided without adding components to a state-of-the-art brake system comprising an electronic parking brake. In particular, electric redundancy can be ensured, as opposed to pneumatically redundancy provided in conventional brake systems. Furthermore, the proposed redundant brake system has a pneumatic layout appropriate for autonomous driving applications. Thus, for example, failsafe operation of a vehicle brake system can be provided both electrically and pneumatically.

A brake system for a vehicle comprises:
a first electric power supply unit;
an electronic brake control unit, wherein the electronic brake control unit is connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
a second electric power supply unit;
an electronic parking brake controller, wherein the electronic parking brake controller is connected to the second electric power supply unit, wherein the electronic parking brake controller is fluidically connected to the spring brake cylinders; and
a pressure modulator unit, wherein the pressure modulator unit is fluidically connected to the first axle pressure modulator, wherein the pressure modulator unit is connected to the electronic parking brake controller, wherein the electronic parking brake controller is configured to issue a control signal for controlling the pressure modulator unit, wherein the pressure modulator unit is configured to command pneumatic control pressure for the first axle pressure modulator depending on the control signal from the electronic parking brake controller.

The vehicle may be a utility vehicle or commercial vehicle, for example a truck, bus or the like. The service brake chambers and the spring brake cylinders may represent brake actuators of the brake system. The electric power supply units may be batteries.

According to an embodiment, the first electric power supply unit and the electronic brake control unit may form part of an electro-pneumatic service brake subsystem. The second electric power supply unit, the electronic parking brake controller and the pressure modulator unit may form part of an electro-pneumatic parking brake subsystem. In the event of a malfunction of the electro-pneumatic service brake subsystem, the electro-pneumatic parking brake subsystem may be usable as a redundant service brake subsystem. In other words, the electro-pneumatic parking brake subsystem may be used to redundantly perform service brake functions in the event of a malfunction of the electro-pneumatic service brake subsystem. In particular, the electronic parking brake controller may be used instead of the electronic brake control unit to perform service brake functions in the event of a malfunction of the electro-pneumatic service brake subsystem. A brake subsystem may also be referred to as a brake circuit. Such an embodiment offers the advantage that redundancy can be added to the brake system to enhance safety, in particular for autonomous driving applications.

According to an embodiment, the electronic parking brake controller may be configured to issue the control signal as an electric signal. The pressure modulator unit may be configured to command the pneumatic control pressure as a proportional pressure. Such an embodiment offers the advantage that electric redundancy can be provided in a reliable and simple manner.

According to an embodiment, the pressure modulator unit may be realized as a stand-alone unit or may be integrated into the first axle pressure modulator or the electronic parking brake controller. Such an embodiment offers the advantage that the pressure modulator unit can be realized in a beneficial manner considering system requirements. For example, the pressure modulator unit can be realized in a space-saving manner.

According to an embodiment, the electronic parking brake controller may be realized as a stand-alone unit or may be integrated into another unit of the brake system. Another unit of the brake system may be a compressed air supply module. Such an embodiment offers the advantage that the electronic parking brake controller can be realized in a beneficial manner considering system requirements. Furthermore, the electronic parking brake controller can be realized in a space-saving manner.

According to an embodiment, the brake system may comprise a trailer control module for controlling braking functions of a trailer of the vehicle. The trailer control module may be connected to the electronic brake control unit. The electronic parking brake controller may be fluidically connected to the trailer control module. Such an embodiment offers the advantage that also a trailer may be connected to the vehicle, which acts as a tractor, and reliably connected to the redundant brake system.

According to an embodiment, the brake system may comprise a further pressure modulator unit. The further pressure modulator unit may be fluidically connected to the trailer control module. The further pressure modulator unit may be connected to the electronic parking brake controller. The electronic parking brake controller may be configured to issue a further control signal for controlling the further pressure modulator unit. The further pressure modulator unit may be configured to pneumatically control the trailer control module depending on the further control signal from the electronic parking brake controller. The further control signal may be different from or identical with the control signal issued by the electronic parking brake controller to the pressure modulator unit. Such an embodiment offers the advantage that the redundant execution of service brake functions by the electronic brake control unit or the electronic parking brake controller in case of a potential malfunction of one of those can also be implemented in a simple and reliable manner for a trailer connected to the vehicle as a tractor.

According to an embodiment, the electronic parking brake controller may be configured to issue the further control signal as an electric signal. The further pressure modulator unit may be configured to pneumatically control the trailer control module depending on trailer load. Such an embodiment offers the advantage that electric redundancy may be provided in a simple and reliable manner not only for a vehicle used as a tractor but also for a trailer.

A vehicle comprises:
an embodiment of the aforementioned the brake system;
the first axle, with which the first axle pressure modulator of the brake system is associated; and
the second axle, with which the second axle pressure modulator of the brake system is associated.

The first axle pressure modulator may be mounted in the vicinity of the first axle. Further elements of the brake system associated with the first axle pressure modulator, such as the service brake chambers and valves, may also be mounted in the vicinity of the first axle. The second axle pressure modulator may be mounted in the vicinity of the second axle. Further elements of the brake system associated with the second axle pressure modulator, such as the spring brake cylinders, may also be mounted in the vicinity of the second axle.

A method of controlling a brake system for a vehicle, wherein the brake system is an embodiment of the aforementioned brake system, comprises:
receiving an error signal representing a malfunction of the first electric power supply unit or the electronic brake control unit or a malfunction of the second electric power supply unit, the electronic parking brake controller or the pressure modulator unit; and
transmitting service brake commands of the vehicle to the electronic parking brake controller in the event of a malfunction of the first electric power supply unit or the electronic brake control unit or to the electronic brake control unit in the event of a malfunction of the second electric power supply unit, the electronic parking brake controller or the pressure modulator unit.

The method or the steps of the method may be executed using a controller. Thus, the method may be executed to control an embodiment of the aforementioned brake system.

Embodiments of the approach presented here shall be explained in greater detail in the subsequent description with reference to the figures.

DETAILED DESCRIPTION

Figure 1:
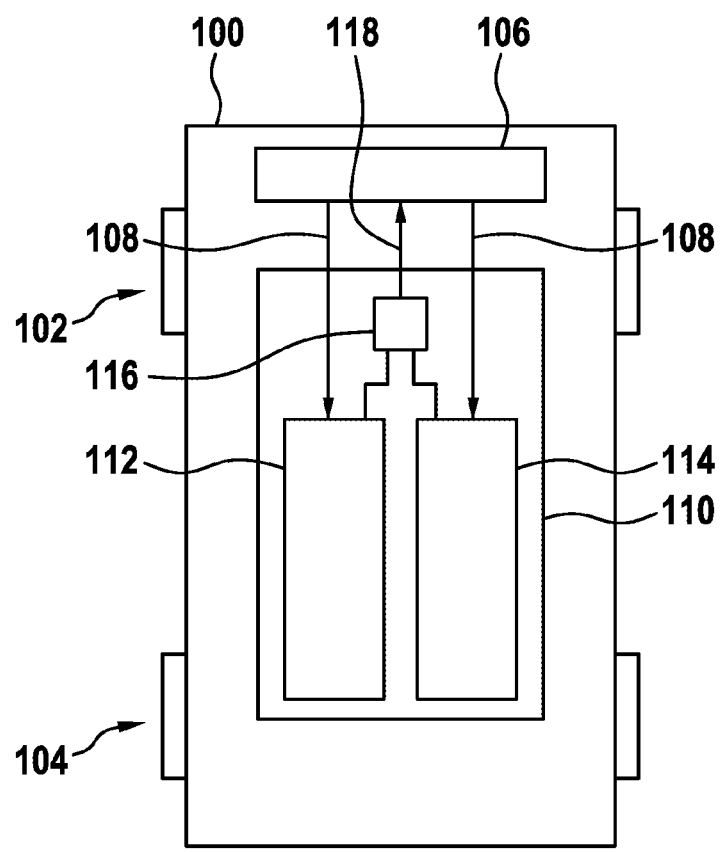
FIG. 1 shows a schematic illustration of a vehicle comprising a brake system according to an embodiment of the present invention.

In the following description of advantageous embodiments of the present invention, the same or similar reference numerals shall be used for the elements depicted in the various figures and acting in a similar way, wherein repeated description of these elements shall be omitted.

FIG. 1 shows a schematic illustration of a vehicle 100 comprising a brake system 110 according to an embodiment of the present invention. The vehicle 100 is a utility vehicle or commercial vehicle, such as a truck. The vehicle 100 comprises a first axle 102 and a second axle 104, according to this embodiment. Furthermore, the vehicle 100 comprises a controller 106 and the brake system 110. The controller 106 is configured to control the brake system 110 by a command signal 108. In particular, the command signal 108 represents service brake commands for performing service brake functions of the brake system 110. Alternatively, the controller 106 also be part of the brake system 110.

The brake system 110 comprises an electro-pneumatic service brake subsystem 112 and an electro-pneumatic parking brake subsystem 114. The electro-pneumatic service brake subsystem 112 is configured to perform service brake functions of the brake system. The electro-pneumatic parking brake subsystem 114 is configured to perform parking brake functions of the brake system 110. Furthermore, as a backup or to provide redundancy, the electro-pneumatic parking brake subsystem 114 is configured to perform service brake functions instead of the electro-pneumatic service brake subsystem 112.

The brake system 110 further comprises a monitoring device 116 for monitoring a state of health of the electro-pneumatic service brake subsystem 112 and the electro-pneumatic parking brake subsystem 114. Alternatively, the monitoring device 116 may also be part of a system other than the brake system 110. The monitoring device 116 is connected to the electro-pneumatic service brake subsystem 112 and to the electro-pneumatic parking brake subsystem 114. The monitoring device 116 is configured to detect a potential malfunction of the electro-pneumatic service brake subsystem 112 or of the electro-pneumatic parking brake subsystem 114. The monitoring device 116 is configured to output an error signal 118 to the controller 106. The error signal 118 represents a malfunction of the electro-pneumatic service brake subsystem 112 or of the electro-pneumatic parking brake subsystem 114.

In response to the error signal 118, the controller 106 is configured to transmit the command signal 108 to either the electro-pneumatic service brake subsystem 112 or the electro-pneumatic parking brake subsystem 114. More specifically, the controller 106 is configured to transmit the command signal 108 to that subsystem 112 or 114 free from malfunction, as indicated by the error signal 118.

Figure 2:
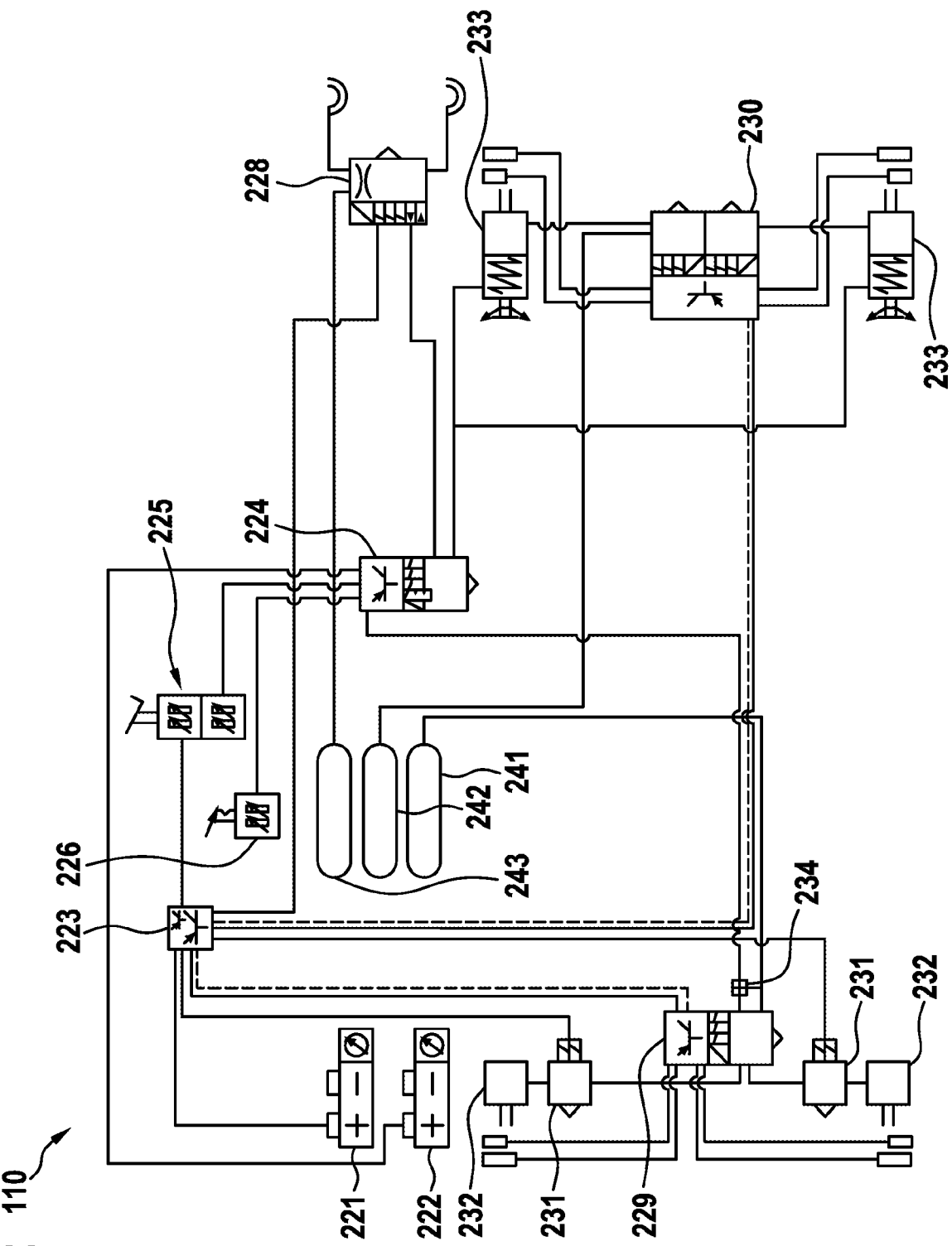
FIG. 2 shows a schematic illustration of a brake system according to an embodiment of the present invention.

FIG. 2 shows a schematic illustration of a brake system 110 according to an embodiment of the present invention. The brake system 110 is a brake system 110 for a vehicle, specifically a commercial vehicle or utility vehicle, e.g. a truck. The brake system 110 corresponds or is similar to the brake system shown in FIG. 1.

The brake system 110 comprises a first electric power supply unit 221, a second electric power supply unit 222, an electronic brake control unit 223, electronic parking brake controller 224, a first or front axle pressure modulator 229, a second or rear axle pressure modulator 230, two service brake chambers 232, two spring brake cylinders 233 and a pressure modulator unit 234. According to this embodiment, the brake system 110 further comprises a redundant brake pedal sensor 225, a park brake lever sensor 226, a trailer control module 228, two pressure control valves 231, a first compressed air supply module 241, a second compressed air supply module 242 and a third compressed air supply module 243.

The first electric power supply unit 221 and the electronic brake control unit 223 form part of the electro-pneumatic service brake subsystem described with reference to FIG. 1. The second electric power supply unit 222, the electronic parking brake controller 224 and the pressure modulator unit 234 form part of the electro-pneumatic parking brake subsystem described with reference to FIG. 1. In the event of a malfunction of the electro-pneumatic service brake subsystem, the electro-pneumatic parking brake subsystem is usable as a redundant service brake subsystem, or in other words to perform service brake functions of the brake system 110.

The first electric power supply unit 221 is electrically connected to the electronic brake control unit 223. The electronic brake control unit 223 is electrically connected to the first axle pressure modulator 229 via an analogous electric signal and supply line and via a digital electric signal line. Furthermore, the electronic brake control unit 223 is electrically connected to the second axle pressure modulator 230 via an analogous electric signal and supply line and via a digital electric signal line. Also, the electronic brake control unit 223 is electrically connected to the pressure control valves 231, to the trailer control module 228 and to the redundant brake pedal sensor 225 via analogous electric signal and supply lines.

The first axle pressure modulator 229 is fluidically connected to the first compressed air supply module 241 via a pneumatic supply line. Also, the first axle pressure modulator 229 is fluidically connected to the pressure control valves 231 via pneumatic service brake control lines. Each of the pressure control valves 231 is fluidically connected to a respective one of the service brake chambers 232 via a pneumatic service brake control line. The first axle pressure modulator 229, the control valves 231 and the service brake chambers 232 are associated with a first axle of the vehicle. Furthermore, the first axle pressure modulator 229 is electrically connected to a group of brake sensors for the first axle via analogous electric signal and supply lines.

The second axle pressure modulator 230 is fluidically connected to the second compressed air supply module 242 via a pneumatic supply line. Furthermore, the second axle pressure modulator 230 is fluidically connected to the spring brake cylinders 233 via pneumatic service brake control lines. The second axle pressure modulator 230 and the spring brake cylinders 233 are associated with a second axle of the vehicle. Also, the second axle pressure modulator 230 is electrically connected to a group of brake sensors for the second axle via analogous electric signal and supply lines.

The second electric power supply unit 222 is electrically connected to the electronic parking brake controller 224. The electronic parking brake controller 224 is electrically connected to the pressure modulator unit 234 via an analogous electric signal and supply line. Furthermore, the electronic parking brake controller 224 is electrically connected to the redundant brake pedal sensor 225 and to the park brake lever sensor 226 via analogous electric signal and supply lines. The electronic parking brake controller 224 is fluidically connected to the spring brake cylinders 233 via pneumatic parking brake control lines. Also, the electronic parking brake controller 224 is fluidically connected to the trailer control module 228 via a pneumatic parking brake control line.

The pressure modulator unit 234 is fluidically connected to the first compressed air supply module 241 via a pneumatic supply line. Furthermore, the pressure modulator unit 234 is fluidically connected to the first axle pressure modulator 229 via a pneumatic service brake control line. The electronic parking brake controller 224 is configured to issue a control signal for controlling the pressure modulator unit 234. In particular, the electronic parking brake controller 224 is configured to issue the control signal as an electric signal. The pressure modulator unit 234 is configured to command pneumatic control pressure for the first axle pressure modulator 229 depending on the control signal from the electronic parking brake controller 224. In particular, the pressure modulator unit 234 is configured to command the pneumatic control pressure as a proportional pressure.

The trailer control module 228 is configured to control braking functions of a trailer coupled to the vehicle. The trailer control module 228 is fluidically connected to the third compressed air supply module 243 via pneumatic supply line.

According to this embodiment, the pressure modulator unit 234 is realized as a stand-alone unit, and the electronic parking brake controller 224 is realized as a stand-alone unit. According to another embodiment, the pressure modulator unit 234 may be integrated into the first axle pressure modulator 229 or into the electronic parking brake controller 224, and/or the electronic parking brake controller may be integrated into another unit of the brake system 110, such as one of the supply modules 241, 242 or 243.

In other words, FIG. 2 shows an architecture of a brake system 110 commercial, which may also be referred to as a schematic a redundant commercial vehicle electronic or electro-pneumatic brake system 110 (EBS). The electro-pneumatic brake system 110 comprises the following main components. The brake system 110 is redundantly supplied by the electric power supply units 221 and 222, which may be batteries. The EBS electronic brake control unit 223 is supplied from the first electric power supply unit 221 or first battery 221. The electronic brake control unit 223 is configured to electronically control the front or first axle pressure modulator 229, the pressure control valves 231 on the front or first axle, the rear or second axle pressure modulator 230 and the trailer control module 228. Front or first axle wheel brakes are actuated by the service brake chambers 232. Rear or second axle wheel brakes are actuated by the spring brake cylinders 233 or spring brake combi cylinders.

The redundant pair of the brake system 110 is provided by the electronic parking brake (EPB) modulator or controller 224, which is configured to actuate the spring brake cylinders 233 on the rear axle. Moreover, the electronic parking brake (EPB) controller 224 provides a pneumatic control signal to the trailer control module 228. According to this embodiment, the front axle or any other axles not equipped with spring brake cylinders 233 are controlled by the electronic parking brake controller 224 using an additional electric output connected to the pressure modulator unit 224. An output of the pressure modulator unit 234 is used to command the pneumatic control pressure for the axle module or first axle pressure modulator 229. The service brake can be commanded by the driver by way the redundant brake pedal sensor 225, which provides separate demand signals for both the EBS and EPB control units, i.e. the electronic brake control unit 223 and the electronic parking brake controller 224. The parking brake can be commanded by the driver by the park brake lever sensor 226. The pressure modulator unit 234 can be a standalone unit or integrated into the electronic parking brake controller 224 or the first axle pressure modulator 229. The electronic parking brake controller can be also a standalone unit or integrated into any other module, such as a compressed air processing unit.

When the brake system 110 is fully intact, the service brake is controlled by the electronic brake control unit 223 as a master. The electronic brake control unit 223 electronically controls the first and second axle pressure modulators 229 and 230 and the trailer control module 228. In case of a malfunction of the electronic brake control unit 223 or the first electric power supply unit 221, brake control is taken over by the electronic parking brake controller 224, and the axle or axles, here the second axle or rear axle, equipped by spring brake chambers 233 is or are actuated by a proportional parking brake control, while other axles without spring brake chambers 233 are controlled pneumatically through the pressure modulator unit 234 and the first axle pressure modulator 229. The pressure modulator unit 234 is electrically connected to the electronic parking brake controller 224. In case the electronic parking brake controller 224 or the second electric power supply unit 222 has any malfunction, the electronic brake control unit 223 is configured to control the brake system 110 as in the normal case. The parking brake function can also be temporally simulated by way of service brake actuation in this case.

Figure 3:
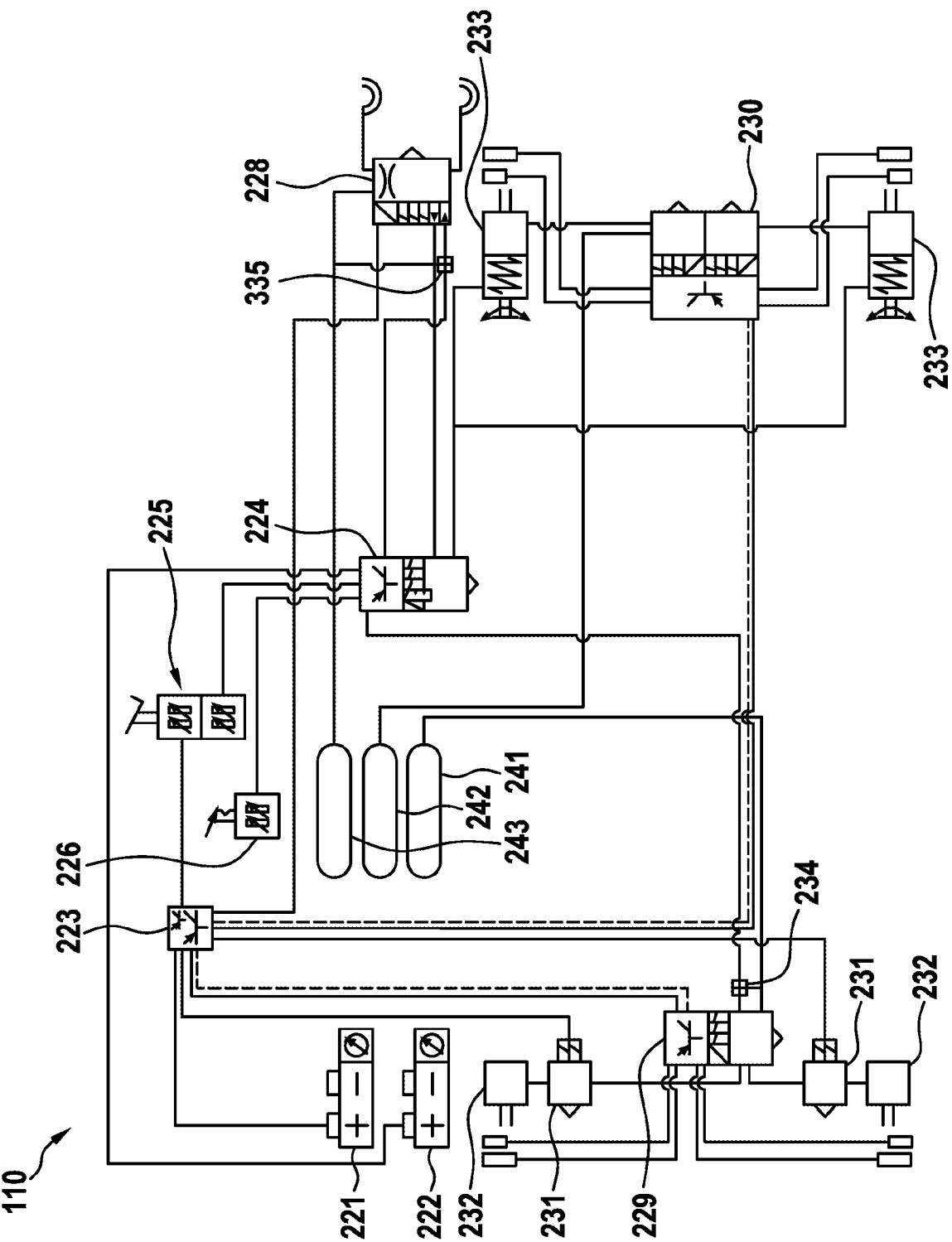
FIG. 3 shows a schematic illustration of a brake system according to an embodiment of the present invention.

FIG. 3 shows a schematic illustration of a brake system 110 according to an embodiment of the present invention. The brake system 110 shown in FIG. 3 corresponds to the brake system shown in FIG. 2 with the exception of a further pressure modulator unit 335.

The further pressure modulator unit 335 is electrically connected to the electronic parking brake controller 224 via an analogous electric signal and supply line. Also, the further pressure modulator unit 335 is fluidically connected to the third compressed air supply module 243 via a pneumatic supply line. Furthermore, the further pressure modulator unit 335 is fluidically connected to the trailer control module 228 via a pneumatic service brake control line.

The electronic parking brake controller 224 is configured to issue a further control signal for controlling the further pressure modulator unit 335. In particular, the electronic parking brake controller 224 is configured to issue the further control signal as an electric signal. The further pressure modulator unit 335 is configured to pneumatically control the trailer control module 228 depending on the further control signal from the electronic parking brake controller 224. In particular, the further pressure modulator unit 335 is configured to pneumatically control the trailer control module 228 depending on trailer load. In other words, the trailer control module 228 can be controlled independently.

In other words, FIG. 3 shows a further possible realization or embodiment, wherein a proportional pneumatic input of the trailer control module 228 is controlled by the additional or further pressure modulator unit 335. This allows for an independent trailer control signal, which can be regulated according to trailer load. Put differently, FIG. 3 shows a schematic of a redundant commercial vehicle electronic brake system 110 with coupled front and rear axle service brake pneumatic control by the electronic parking brake controller 224. An output of the pressure modulator unit 234 is configured to pneumatically control the first axle pressure modulator 229, and an output of the further pressure modulator unit 335 is configured to control the trailer control module 228 of the vehicle acting as tractor.

Figure 4:
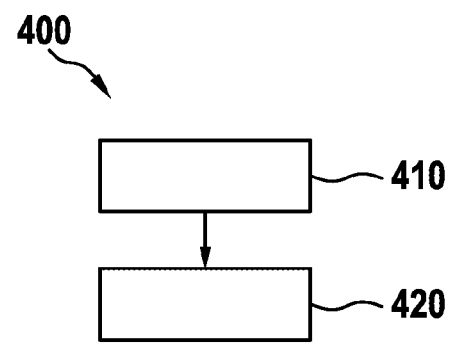
FIG. 4 shows a flowchart of a method of controlling a brake system according to an embodiment of the present invention.

FIG. 4 shows a flowchart of a method 400 of controlling a brake system according to an embodiment of the present invention. The method 400 is executable in connection with the brake system as described with reference to one of the preceding figures or a similar brake system.

In general, the method 400 can be executed in connection with a brake system for a vehicle. Such a brake system comprises a first electric power supply unit, an electronic brake control unit, wherein the electronic brake control unit is connected to the first electric power supply unit, a first axle pressure modulator for service brake chambers associated with a first axle of the vehicle, wherein the first axle pressure modulator is connected to the electronic brake control unit, a second axle pressure modulator for spring brake cylinders associated with a second axle of the vehicle, wherein the second axle pressure modulator is connected to the electronic brake control unit, a second electric power supply unit, an electronic parking brake controller, wherein the electronic parking brake controller is connected to the second electric power supply unit, wherein the electronic parking brake controller is fluidically connected to the spring brake cylinders, and a pressure modulator unit, wherein the pressure modulator unit is fluidically connected to the first axle pressure modulator, wherein the pressure modulator unit is connected to the electronic parking brake controller, wherein the electronic parking brake controller is configured to issue a control signal for controlling the pressure modulator unit, wherein the pressure modulator unit is configured to command pneumatic control pressure for the first axle pressure modulator depending on the control signal from the electronic parking brake controller.

The method 400 of controlling comprises a step 410 of receiving an error signal representing a malfunction of the first electric power supply unit or the electronic brake control unit or a malfunction of the second electric power supply unit, the electronic parking brake controller or the pressure modulator unit. Furthermore, the method 400 of controlling comprises a step 420 of transmitting service brake commands of the vehicle to the electronic parking brake controller in the event of a malfunction of the first electric power supply unit or the electronic brake control unit or to the electronic brake control unit in the event of a malfunction of the second electric power supply unit, the electronic parking brake controller or the pressure modulator unit.

With reference to the aforementioned figures, according to an embodiment, the electronic parking brake (EPB) controller 224, which may be standalone or integrated into any other pneumatic module, such as an air supply unit, is also used as a redundancy for brake actuation on axles equipped with spring brake actuators and on other axles without such actuators, which are controlled by using pressure modulator units, such as the pressure unit 234 and/or pressure modulator unit 335, actuating a backup port of the axle pressure modulator(s) concerned, such as the first axle pressure modulator 229.

THE REFERENCE NUMERAL LIST IS AS FOLLOWS

100 vehicle
102 first axle
104 second axle
106 controller
108 command signal
110 brake system
112 electro-pneumatic service brake subsystem
114 electro-pneumatic parking brake subsystem
116 monitoring device
118 error signal
221 first electric power supply unit
222 second electric power supply unit
223 electronic brake control unit
224 electronic parking brake controller
225 redundant brake pedal sensor
226 park brake lever sensor
228 trailer control module
229 first axle pressure modulator
230 second axle pressure modulator
231 pressure control valve
232 service brake chamber
233 spring brake cylinder
234 pressure modulator unit
241 first compressed air supply module
242 second compressed air supply module
243 third compressed air supply module
335 further pressure modulator unit
400 method of controlling
410 step of receiving
420 step of transmitting

The invention claimed is:

1. A brake system for a vehicle, comprising:
a first electric power supply unit;
an electronic brake control unit connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
a second electric power supply unit;
an electronic parking brake controller, wherein the electronic parking brake controller is connected to the second electric power supply unit, and wherein the electronic parking brake controller is fluidically connected to the spring brake cylinders; and
a pressure modulator unit fluidically connected to the first axle pressure modulator, wherein the pressure modulator unit is connected to the electronic parking brake controller, wherein the electronic parking brake controller is configured to issue a control signal for controlling the pressure modulator unit, and wherein the pressure modulator unit is configured to command pneumatic control pressure for the first axle pressure modulator depending on the control signal from the electronic parking brake controller.

2. The brake system of claim 1, wherein the first electric power supply unit and the electronic brake control unit form part of an electro-pneumatic service brake subsystem, wherein the second electric power supply unit, the electronic parking brake controller and the pressure modulator unit form part of an electro-pneumatic parking brake subsystem, and wherein when there is a malfunction of the electro-pneumatic service brake subsystem the electro-pneumatic parking brake subsystem is usable as a redundant service brake subsystem.

3. The brake system of claim 1, wherein the electronic parking brake controller is configured to issue the control signal as an electric signal, and wherein the pressure modulator unit is configured to command the pneumatic control pressure as a proportional pressure.

4. The brake system of claim 1, wherein the pressure modulator unit includes a stand-alone unit or is integrated into the first axle pressure modulator or the electronic parking brake controller.

5. The brake system of claim 1, wherein the electronic parking brake controller includes a stand-alone unit or is integrated into another unit of the brake system.

6. The brake system of claim 1, further comprising:
a trailer control module for controlling braking functions of a trailer of the vehicle, wherein the trailer control module is connected to the electronic brake control unit, and wherein the electronic parking brake controller is fluidically connected to the trailer control module.

7. The brake system of claim 6, further comprising:
a further pressure modulator unit fluidically connected to the trailer control module, wherein the further pressure modulator unit is connected to the electronic parking brake controller, wherein the electronic parking brake controller is configured to issue a further control signal for controlling the further pressure modulator unit, and wherein the further pressure modulator unit is configured to pneumatically control the trailer control module depending on the further control signal from the electronic parking brake controller.

8. The brake system of claim 7, wherein the electronic parking brake controller is configured to issue the further control signal as an electric signal, and wherein the further pressure modulator unit is configured to pneumatically control the trailer control module depending on a trailer load.

9. A vehicle, comprising:
a brake system, including:
a first electric power supply unit;
an electronic brake control unit connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
a second electric power supply unit;
an electronic parking brake controller, wherein the electronic parking brake controller is connected to the second electric power supply unit, and wherein the electronic parking brake controller is fluidically connected to the spring brake cylinders; and
a pressure modulator unit fluidically connected to the first axle pressure modulator, wherein the pressure modulator unit is connected to the electronic parking brake controller, wherein the electronic parking brake controller is configured to issue a control signal for controlling the pressure modulator unit, and wherein the pressure modulator unit is configured to command pneumatic control pressure for the first axle pressure modulator depending on the control signal from the electronic parking brake controller.

10. A method of controlling a brake system for a vehicle, the method comprising:
receiving an error signal representing a malfunction of a first electric power supply unit or an electronic brake control unit or a malfunction of a second electric power supply unit, an electronic parking brake controller or a pressure modulator unit; and
transmitting service brake commands of the vehicle to the electronic parking brake controller in the event of a malfunction of the first electric power supply unit or the electronic brake control unit or to the electronic brake control unit in the event of a malfunction of the second electric power supply unit, the electronic parking brake controller or the pressure modulator unit;
wherein the brake system includes:
the first electric power supply unit;
the electronic brake control unit connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
the second electric power supply unit;
the electronic parking brake controller, wherein the electronic parking brake controller is connected to the second electric power supply unit, and wherein the electronic parking brake controller is fluidically connected to the spring brake cylinders; and
the pressure modulator unit fluidically connected to the first axle pressure modulator, wherein the pressure modulator unit is connected to the electronic parking brake controller, wherein the electronic parking brake controller is configured to issue a control signal for controlling the pressure modulator unit, and wherein the pressure modulator unit is configured to command pneumatic control pressure for the first axle pressure modulator depending on the control signal from the electronic parking brake controller.

* * * * *